United States Patent
Kulick (10) Patent No.: US 10,576,316 B1
(45) Date of Patent: Mar. 3, 2020

(54) ACCESSORY MOUNTING BRACKET

(71) Applicant: Scosche Industries, Inc., Oxnard, CA (US)

(72) Inventor: Michael Kulick, Simi Valley, CA (US)

(73) Assignee: Scosche Industries, Inc., Oxnard, CA (US)

( * ) Notice: Subject to any disclaimer, the term of this patent is extended or adjusted under 35 U.S.C. 154(b) by 0 days.

(21) Appl. No.: 16/127,874

(22) Filed: Sep. 11, 2018

(51) Int. Cl.
| | |
|---|---|
| *F16M 11/00* | (2006.01) |
| *A62C 13/78* | (2006.01) |
| *F16B 7/04* | (2006.01) |
| *F16M 11/04* | (2006.01) |
| *F16M 13/02* | (2006.01) |

(52) U.S. Cl.
CPC ............ *A62C 13/78* (2013.01); *F16B 7/0433* (2013.01); *F16M 11/04* (2013.01); *F16M 13/02* (2013.01)

(58) Field of Classification Search
CPC ............................... A47C 7/68; F02M 21/0221
See application file for complete search history.

(56) References Cited

U.S. PATENT DOCUMENTS

| | | | | |
|---|---|---|---|---|
| 5,074,506 | A | * 12/1991 | Larsen | ..................... B63B 17/00 248/284.1 |
| 5,474,273 | A | * 12/1995 | Vinal | ....................... A47C 7/68 248/126 |
| D782,745 | S | 3/2017 | Childs et al. | |
| 2015/0096977 | A1 * | 4/2015 | Sirosh | ................ F02M 21/0221 220/4.14 |

OTHER PUBLICATIONS

Allstar Perfomance Quick Release Fire Extinguisher Mount [https://www.jegs.com/i/Allstar-Performance/049/ALL10512/10002/-1] Aug. 15, 2018.
Assault Industries Fire Extinguisher Quick Release Kit [https://www.sxsmods.com/yamaha-yxz1000r-fire-extinguisher-quick-release-kit] Apr. 30, 2017.
Axia Alloys Fire Extinguisher Mount [https://www.utvdriver.com/buyers-guide-utv-fire-extinguishers-and-mounts#page-2] Apr. 2, 2018.
Axia Alloys Fire Extinguisher with Quick Release [https://www.sidebysidestuff.com/axia-alloys-fire-extinguisher-mount-w--quick-release.html] Jun. 30, 2018.

(Continued)

*Primary Examiner* — Amy J. Sterling
(74) *Attorney, Agent, or Firm* — Stetina Brunda Garred & Brucker (57) ABSTRACT

A mounting bracket for releasably securing an article to a structure includes a first and second bracket assembly each including one or more ring clamps defined by opposed ring end arms, a clamp base defining one or more pairs of slots each receptive to corresponding ones of the opposed ring end arms of the ring clamps, and a clamp base coupling. One set of ring clamps with one of the clamp bases are engageable to the article. The other set of ring clamps with the other one of the clamp bases are engageable to the structure. One of the clamp bases couplings is engageable with the other clamp base coupling, and a locking pin is removably engaged therewith.

20 Claims, 4 Drawing Sheets

(56) References Cited

OTHER PUBLICATIONS

Eddie Motorsports' Billet Aluminum Quick-Release Fire Extinguisher Brackets [https://www.powerperformancenews.com/news/eddie-motorsports-billet-aluminum-quick-release-fire-extinguisher-brackets/] Sep. 3, 2014.
Fire Extinguisher Bar Mount [http://www.livorsi.com/catalog/powder.htm] Sep. 6, 2018.
Safecraft Portable Fire Extinguisher with Quick Release [http://www.concordpolaris.com/inventory/safecraft-portable-fire-extinguisher-3lb-w-quick-release/] Aug. 4, 2018.
Tek208 Quick Release Fire Extinguisher Mount [https://www.amazon.com/Tek208-Quick-Release-Extinguisher-Anodized/dp/B0779F1V9D] Nov. 9, 2017.
Fire Extinguisher Mount [https://www.rzrforums.net/general-rzr-discussion/486586-best-fire-extinguisher-mount-does-not-rattle-5.html] Feb. 15, 2018.
Lightronic 2 pcs 38MM 1.5" Roll Bar Clamp Rotatable led Tube Clamp Light Brackets [https://www.amazon.com/Lightronic-Clamp-Rotatable-Light-Brackets/dp/B01LWRYNSR] Nov. 13, 2016.
Axia Alloys Billet GoPro Roll Cage Mount [https://www.amazon.com/Lightronic-Clamp-Rotatable-Light-Brackets/dp/B01LWRYNSR] Aug. 7, 2016.
Honda Genuine Accerssories ROPS Clamp [https://www.motosport.com/honda-genuine-accessories-rops-clamp] Sep. 21, 2017.
Rugged Radios Bar Mounts [https://utvunderground.com/forum/index.php?threads/roll-cage-mounting-solutions-from-rugged.16467/] Jan. 20, 2009.
LED Light Bar Clamps [https://www.bluhmenterprises.com/gallery.php?id=52] Apr. 19, 2016.
Slasher Light Clamp [https://thumpertalk.com/forums/topic/1242899-my-led-light-build-for-night-riding/?page=3] Apr. 4, 2018.

\* cited by examiner

ACCESSORY MOUNTING BRACKET

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to an apparatus for securing various articles to a structure, and more particularly, to brackets for releasably mounting accessories.

2. Related Art

While operating a motor vehicle, ready access to a variety of accessories beyond standard installed components and controls therefor may be needed or desired. For example, navigation, audio playback, and/or telephone communication functions of a smartphone may need to be utilized while driving an automobile, and a hands-free operation may be best facilitated by mounting the smartphone to the dashboard, an air conditioning vent, or other surface proximal to the driver. There are numerous smartphone mount devices known in the art, including those that clamp the smartphone in a cradle, with the cradle, in turn, being attached to the dashboard or the windshield via a suction cup mount, an adhesive mount, or the like. Instead of a cradle, there may be a magnetic head that magnetically couples to smartphone to the head, while using the same base mounts.

Within the enclosed space of an interior of an automobile or the like that is travelling on smooth, established roadways, the durability and extent of securement of the accessory mounts are not as critical compared to vehicles that are operated under harsher conditions. There are greater demands on accessory mounts for vehicles in which the operator, and hence accessories that are immediately accessible to the operator, that are exposed to greater wind, shock, and vibration forces such as all-terrain vehicles, motorcycles, and the like. Furthermore, such vehicles may have fewer locations in its interior to which an accessory mount can be attached. For example, one of the few locations on a motorcycle in which additional components can be mounted for view/access/use during operation is the handlebar. All-terrain vehicles (ATVs) and utility vehicles (UTVs), and various off-highway vehicles are likewise limited with respect to the locations on which an accessory mount can be attached, though such vehicles may have roll cages and other tubular structures that surround the driver and passengers.

Besides smartphones, another highly recommended vehicle accessory, particularly for the aforementioned ATVs, UTVs, and other off-highway vehicles, is a fire extinguisher. Due to the rough terrain in which such vehicle are operated, they are more prone to rollovers that result in spilled fuel and other combustibles. Furthermore, because of the remoteness of these locations, firefighters and other first responders may not be able to get to the site of the accident or fire before the entirety of the vehicle is destroyed.

Fires, particularly those with a readily available fuel source, tend to spread quickly, and so it is important for a vehicle fire extinguisher to be immediately retrievable. Accordingly, there is a dual need for the fire extinguishers to be mounted to those parts of the vehicle structure that are within reach of the driver or passengers, and for the fire extinguisher to be easily disengageable from the mount. The fine motor skills of the user may be diminished as a consequence of the shock from the accident, and the panic of the fire, so the engagement/disengagement mechanism should be operable with simple manipulations. At the same time, because the typical mount points are subject to various forms of mechanical shock during operation of the vehicle, and especially so when crashing, so there is a need for the mounts to be robust and securely maintain the fire extinguisher in a set position.

Many existing mounts utilize various types of ring clamps that secure the body of the fire extinguisher, and a separate set of clamps mounted to the tubular structure of a roll cage or the like. Various securement mechanisms releasably couple the vehicle structure mounting clamps and the ring clamps for the fire extinguisher body.

Existing fire extinguisher mounts are limited, however, in a number of ways. The respective circumferential dimensions of the fire extinguisher are somewhat standardized, with any deviation in dimensions within a single capacity class being readily accommodated with ring clamps capable of smaller adjustments. In order to maintain adjustability, more flexible, though thinner clamps were utilized, and fabricated as an integral part of the quick release mechanism. Furthermore, with respect to quick release mechanisms, complicated cross-pin configurations that required two-handed operation to remove the fire extinguisher from the vehicle structure were employed. Accordingly, there is a need in the art for an improved universal accessory mount.

BRIEF SUMMARY

The present disclosure is directed to an accessory mounting bracket. More particularly, one embodiment is a mounting bracket for releasably securing an article to a structure. There may be a first bracket assembly that includes one or more first ring clamps each defined by opposed ring end arms. The first bracket assembly may also include a first clamp base defining one or more pairs of slots each receptive to corresponding ones of the opposed ring end arms of the one or more first ring clamps. The first clamp base may include a first clamp base coupling, each of the one or more first ring clamps together with the first clamp base being engageable to the article. The mounting bracket may also include a second bracket assembly with one or more second ring clamps each defined by opposed ring end arm. The mounting bracket may include a second clamp base defining one or more pairs of slots each receptive to corresponding ones of the opposed ring end arms of the one or more second ring clamps. The second clamp base may also include a second clamp base coupling engageable with the first clamp base coupling. Each of the one or more second ring clamps together with the second clamp base may be engageable to the structure. The mounting bracket may also include a locking pin removably engaged with the first clamp base coupling and the second clamp base coupling.

Another embodiment of the present disclosure is a releasable mounting bracket assembly. The mounting bracket assembly may include a first clamp base defining one or more pairs of first retainer slots and fastener through-holes extending between given pairs thereof. The first clamp base may include a first base coupling. Additionally, there may be one or more first retainers with ends insertable into a given pair of the first retainer slots, as well as one or more fasteners compressively retaining each of the one or more first retainers and extending through the respective one of the fastener through-holes of the first clamp base. The mounting bracket assembly may include a second clamp base defining one or more pairs of retainer slots and fastener through-holes extending between given pairs thereof. The second clamp base may include a second base coupling engageable with the first base coupling. There may additionally be one or more second retainers with ends insertable into a given pair of the second retainer slots. The mounting bracket assembly may further include one or more fasteners compressively retaining each of the one or more second retainers and extending through the respective one of the fastener through-holes of the second clamp base.

Yet another embodiment of the present disclosure is directed to a universal bracket base for interchangeable clamps. The bracket base may include a body defined by an at least partially arcuate clamp-side face, a complementary base engagement face, and side faces. The body may further define one or more pairs of slots and cross through-holes extending between each of the pairs of slots. The slots may be receptive to the interchangeable clamps and also be securable with fasteners inserted in the cross through-holes and compressively retained at opposite ends. The bracket base may also include a coupling centrally disposed on the complementary base engagement face of the body.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of an accessory mounting bracket, and is not intended to represent the only form in which it can be developed or utilized. The description sets forth the structure and functions of the bracket in connection with the illustrated embodiments. It is to be understood, however, that the same or equivalent functions may be accomplished by different embodiments that are also intended to be encompassed within the scope of the present disclosure. It is further understood that the use of relational terms such as first, second, left, right, top, bottom, distal, proximal, and the like are used solely to distinguish one from another entity without necessarily requiring or implying any actual such relationship or order between such entities.

Figure 1:
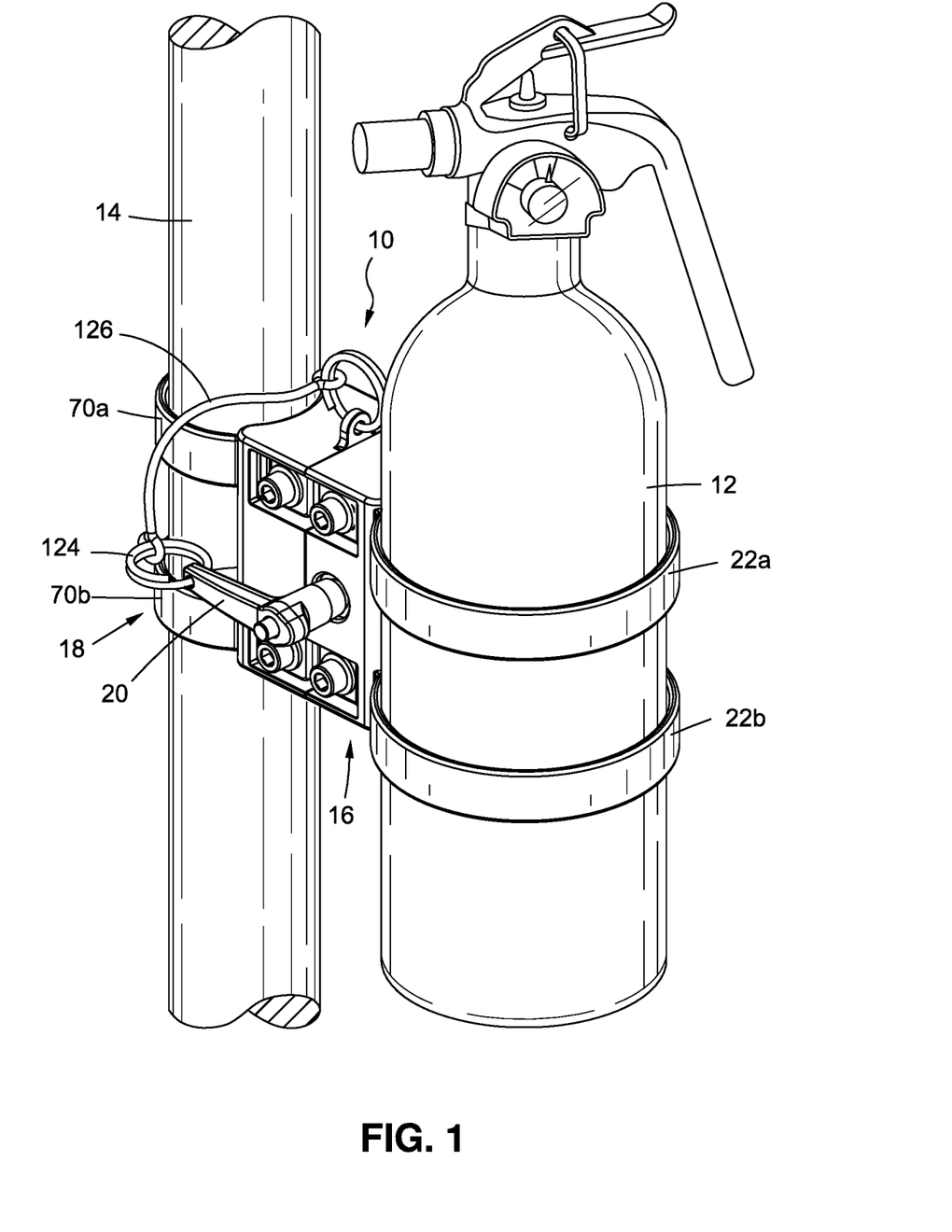
FIG. 1 is a perspective view of an accessory mounting bracket in accordance with one embodiment of the disclosure securing a fire extinguisher to a tubular structure.

Referring now to FIG. 1, the various embodiments of the present disclosure are directed to a mounting bracket 10 for releasably securing an article 12 to a structure 14. As shown, the article 12 is a fire extinguisher with a cylindrical body, though this is by way of example only and not by limitation. The mounting bracket 10 may be adapted for other articles, and such articles are not limited to those having a predominantly cylindrical shape. The structure 14 is understood to be that of a vehicle and may have a tubular configuration such as a roll cage or frame, but again, this is also by way of example only. The mounting bracket may be adapted for attaching to any other structure.

Figure 2:
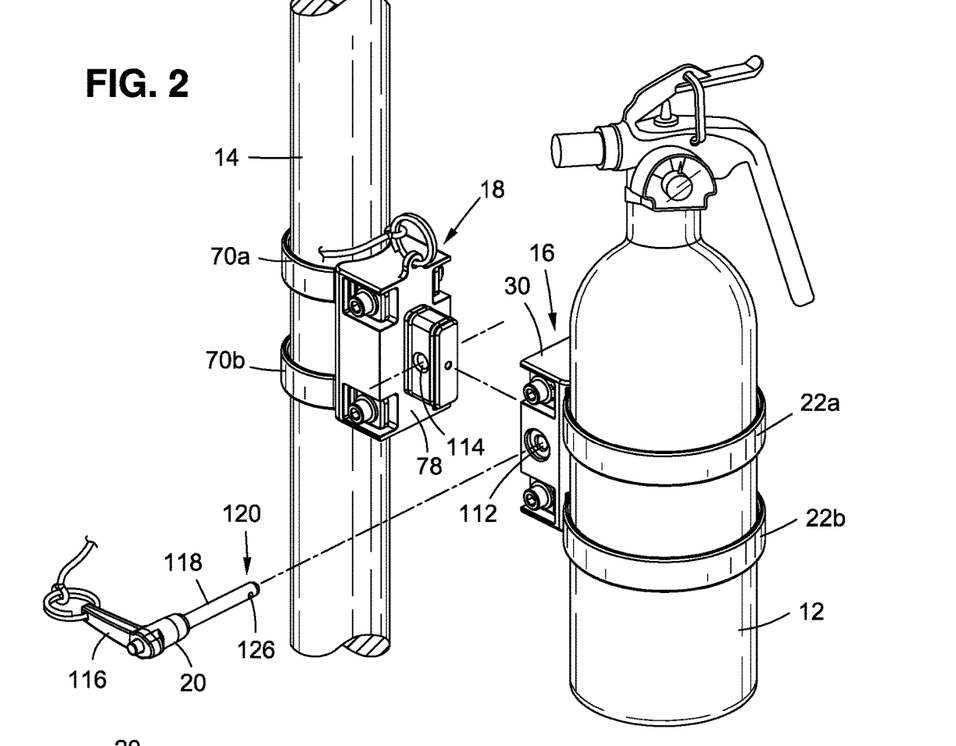
FIG. 2 is a left perspective view of the accessory mounting bracket with a first bracket assembly secured to the fire extinguisher separated from a second bracket assembly secured to the tubular structure.
Figure 3:
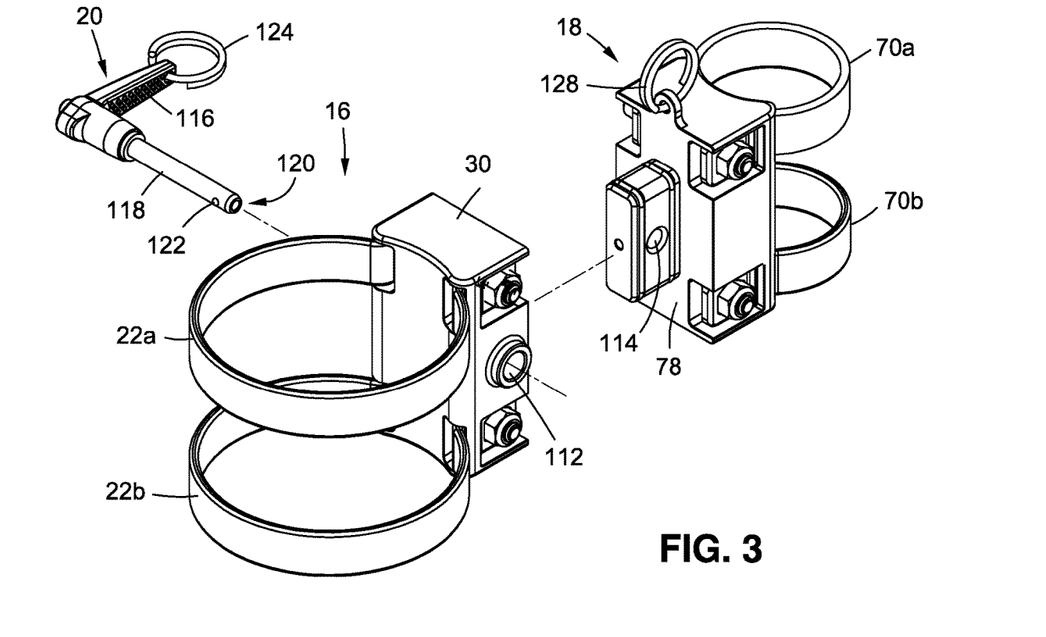
FIG. 3 is a detailed right perspective view of the first bracket assembly separate from the second bracket assembly.

With additional reference to FIGS. 2 and 3, the mounting bracket 10 generally includes a first bracket assembly 16 that is attached to the article 12, and a second bracket assembly 18 that is attached to the structure 14. The bracket assemblies 16, 18, are permanently or semi-permanently mounted to the article 12 and structure 14, respectively. As will be described in further detail below, the first bracket assembly 16 is releasably engageable from the second bracket assembly 18, that is, although the two assemblies are coupled together in a static condition, with minimal manipulation, capable of being readily separated.

In one embodiment, the mounting bracket 10 includes a locking pin 20 that is removably engaged to the first bracket assembly 16 and the second bracket assembly 18. Once the locking pin 20 is removed from the combined first bracket assembly 16 and the second bracket assembly 18, the first bracket assembly 16 may be separated from the second bracket assembly 18. FIGS. 2 and 3 illustrate such a separated configuration, while FIG. 1 illustrates the assembled, e.g., locked configuration in which the article 12 is effectively mounted to the structure 14.

Figure 4:
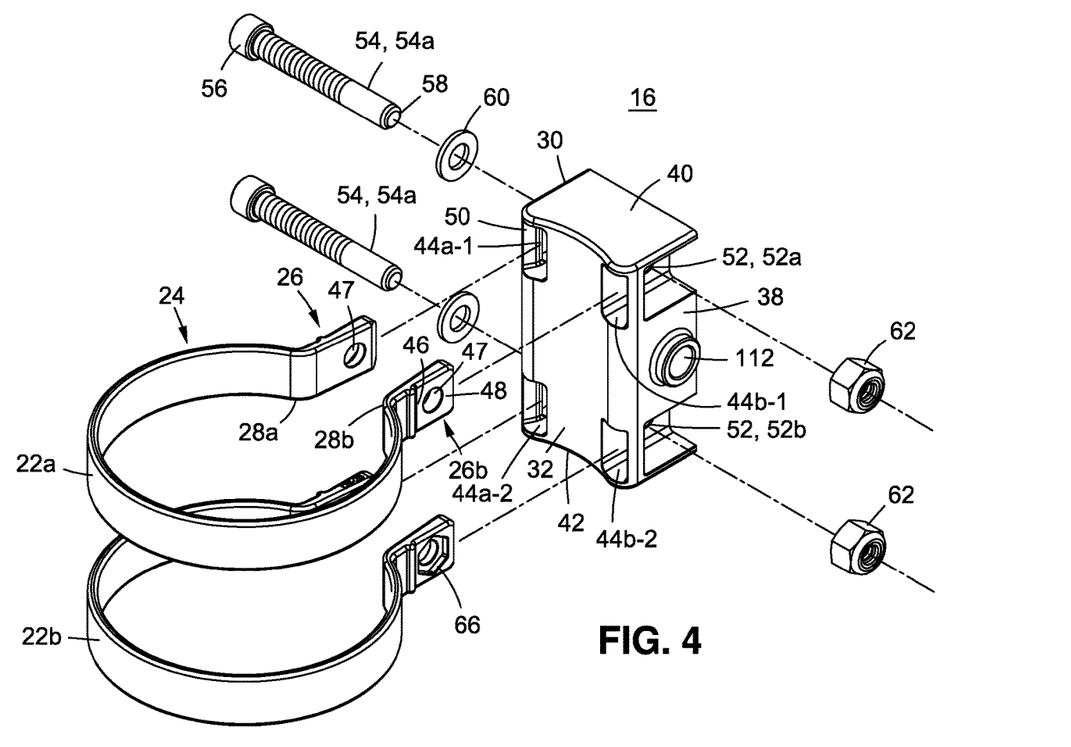
FIG. 4 is an exploded view of the first bracket assembly.
Figure 5:
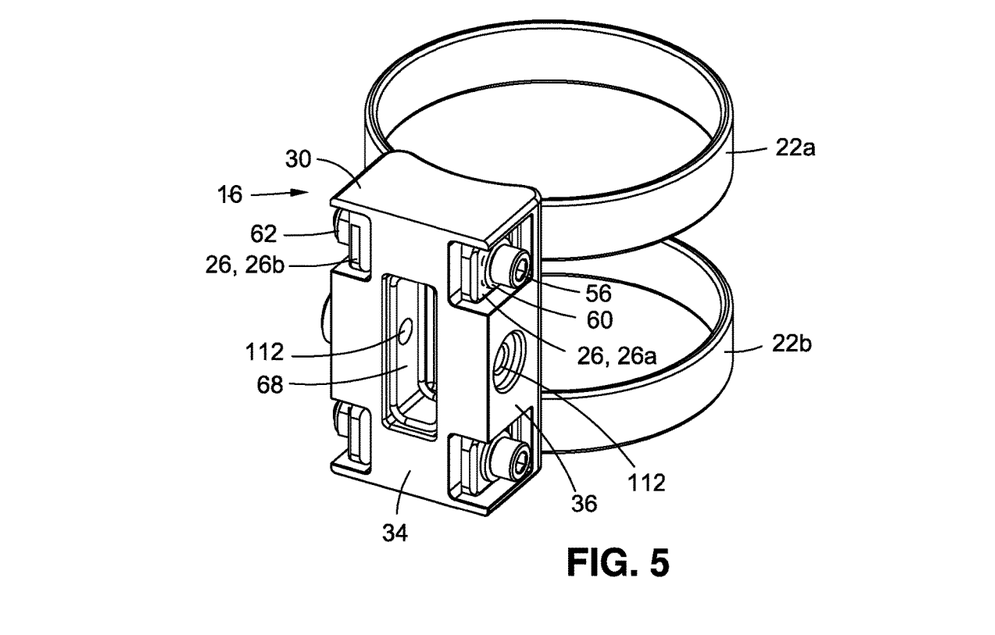
FIG. 5 is a perspective view of the first bracket assembly.

Referring additionally to FIGS. 4 and 5, the first bracket assembly 16 for securing the article 12 includes a pair of first ring clamps 22a and 22b, which are referenced as such for their association with the first bracket assembly 16. The first ring clamp 22 is generally defined by an arcuate portion 24 that is configured to conform to the cylindrical body of the article 12, as well as opposed ring end arms 26a, 26b. The ring end arm 26a and the ring end arm 26b are spaced apart and extend in a parallel relation to each other. Between the ring end arms 26 and the arcuate portion 24 the first ring clamp 22 may be defined by respective bends 28a, 28b that transitions between these two segments. In one embodiment, the first ring clamp 22 is fabricated from a single strip of a flexibly rigid material that retains the shape as described, such as spring steel, but this is by way of example only and not of limitation. The appropriate thickness and the type of material for maintaining the retention of a given article 12 is within the purview of one of ordinary skill in the art. Furthermore, while various embodiments are presented with ring clamps, the present disclosure is not intended to be limited thereto. Other types of mounts are also deemed to be within the scope of the present disclosure.

The first bracket assembly 16 also includes a first clamp base 30, which is likewise so referenced because of its association with the first bracket assembly 16. The first clamp base 30 has a generally cuboid configuration with a clamp-side face 32, a complementary base-side face 34, a right side face 36, a left side face 38 opposed thereto, a top face 40, and a bottom face 42 opposed thereto. The cuboid shape is presented by way of example only, and any other suitable shape may be utilized for the first clamp base 30 without departing from the scope of the present disclosure. The clamp-side face 32 is contemplated to be arcuate, and its curvature parameters conform to those of the first ring clamp 22. The article 12 is understood to be compressively retained by both the first ring clamp 22 and the first clamp base 30, and so the arcuate configuration of the clamp-side face 32 is understood to maximize the contact surface area therewith.

The first clamp base 30 defines one or more pairs of slots 44. More particularly, the upper end of the first clamp base 30 defines a first pair of slots 44a-1, 44b-1, while the opposed bottom end of the same defines a second pair of slots 44a-2, 44b-2. There may be additional slots 44 as needed, though only two pairs are utilized in the illustrated embodiment. Each pair of slots 44a and 44b are understood to receptively engage the first ring clamps 22. That is, the first pair of slots 44a-1 and 44b-1 receive the ring end arm 26a and ring end arm 26b, respectively of the first ring clamp 22a. The second pair of slots 44a-2 and 44b-2 receive the corresponding ring end arms 26 of the first ring clamp 22b.

In further detail, first ring clamps 22 may be frictionally locked to the first clamp base 30. As best illustrated in FIG. 4, the ring end arm 26 defines a ridge 46 and a wedge end portion 48. The spacing of the pair of slots 44a-2 and 44b-2 are understood to be narrower than the uncompressed static state of the first ring clamps 22. Thus, in order to insert the ring end arm 26 into the first pair of slots 44a, the first ring clamps 22 are compressed, that is, the ring end arms 26 are pinched toward each other to narrow its spacing. It is also possible to apply a force just in the insertion direction, which is translated to a perpendicular compression force by the ridge 46 to narrow the spacing between the ring end arms 26.

Once inserted, the first ring clamps 22 are understood to expand and return to its original shape, at least with respect to the ring end arms 26. While in the compressed state, the ridge 46 passes through the slot 44. Once expanded, the ridge 46 engages an outer columnar wall 50 of the first clamp base 30. The ridge 46 therefore restricts the removal of the first ring clamps 22, though applying a compression force to the ends of the arcuate portion 24 toward the ring end arms 26 can narrow the spacing therebetween to allow the same to pass through the slots 44 and bypass the outer columnar wall 50.

Although the first ring clamps 22 are retained within the first clamp base 30, and additional modality for securing this coupling is contemplated. The first clamp base 30 defines cross through-holes 52 that extend between the corresponding pairs of the slots 44. That is, there is a first cross through-hole 52a defined by the first clamp base 30 that extends from the first slot 44a-1 to the second slot 44b-1, and a second through-hole 52b that extends from the first slot 44a-2 to the second slot 44b-2. Along the same lines, the wedge end portion 48 of the first ring clamps 22 similarly define holes 47 that, with the first ring clamps 22 fully inserted into the slots 44, are aligned with the cross through-holes 52.

Fasteners 54 are inserted to secure the first ring clamps 22 to the first clamp base 30. In the illustrated example, the fastener 54 is a threaded bolt with a head 56 and an opposed tip 58. The head 56 engages a washer 60, which compresses against one of the ring end arms 26 of the first ring clamps 22 and the wall defining the slot 44 of the first clamp base 30. The shank of the bolt passes through the aforementioned hole 47 of the first ring end arm 26a, then through the washer 60, and through the cross through-hole 52. The second ring end arm 26b abuts against the wall defining the slot 44 and the fastener 54 passes through the hole 47 of the second ring end arm 26b. A nut 62 is threaded on to the bolt and tightened. According to one embodiment, the second ring end arm 26b may define a correspondingly shaped inset 66 that restricts the rotational movement of the nut 62, such that only the drive of the fastener 54 need be manipulated. Along these lines, the exemplary embodiments shown in the figures utilize a hex head, but it will be recognized that any other suitable drive may be substituted. The left and right side faces 36, 38 of the first clamp base 30 are understood to be open and substantially in alignment with the slots 44 to provide access for the fastener 54 and the nut 2. Although some of the foregoing features have been discussed in the context of the first ring clamp 22a, it will be appreciated that the same configuration is applicable to the first ring clamp 22b.

As best illustrated in FIG. 5, the first clamp base 30 includes a first clamp base coupling 68. In this particular embodiment, the first clamp base coupling 68 is a socket that is defined within the body of the first clamp base 30 with an opening on the complementary base-side face 34 thereof. This surface is so named because it faces a complementary second clamp base 78 of the second bracket assembly 18. The socket is understood to receive a plug that is, at least in part, frictionally retained by the same. Additional details of this feature and its relation to the locking pin 20 will be provided below.

With reference to FIGS. 1, 2, 3, and 6, the second bracket assembly 18 for securing the structure 14 includes a pair of second ring clamps 70a and 70b, which are referenced as such for their association with the second bracket assembly 18. In almost all respects, the first ring clamps 22 are the same as the second ring clamps 70. However, the size of the second ring clamps 70 may be different, e.g., smaller, since the tubular structure 14 may have a smaller circumference than the article 12.

Figure 6:
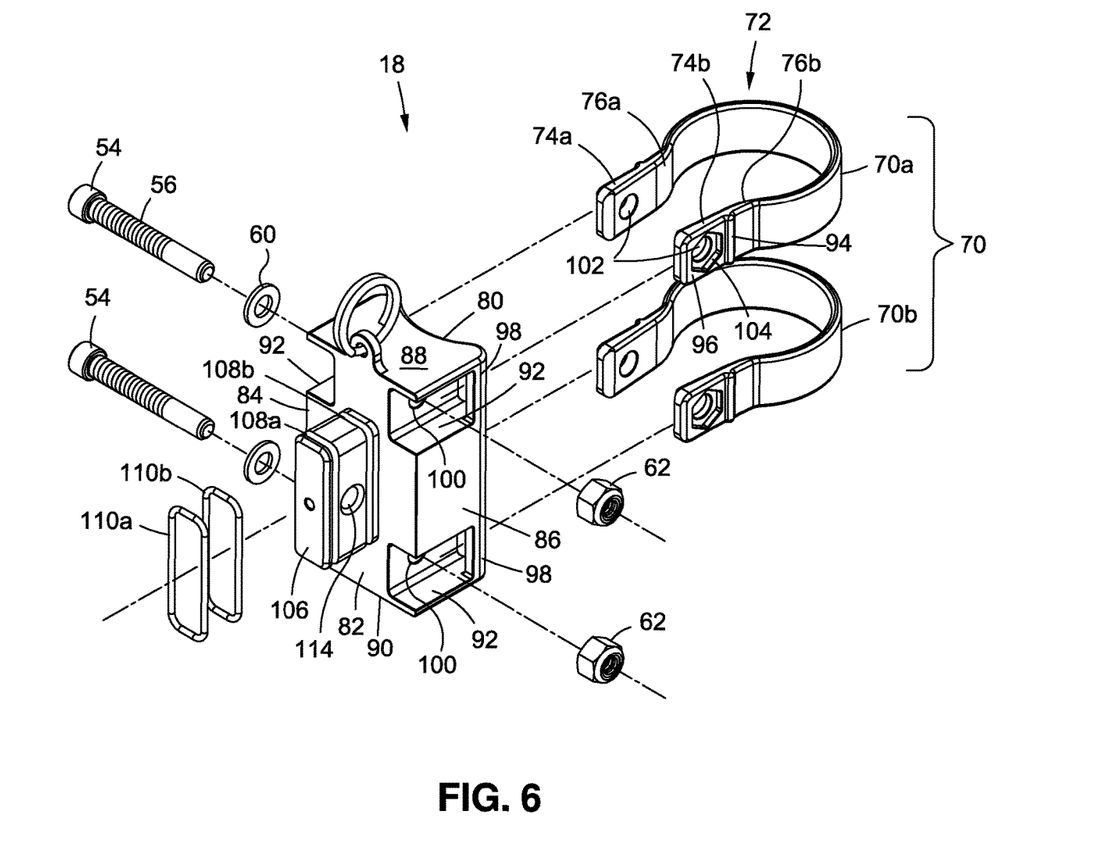
FIG. 6 is an exploded view of the second bracket assembly.

The second ring clamp 70 is generally defined by an arcuate portion 72 that is configured to conform to the cylindrical body of the structure 14, and opposed ring end arms 74a, 74b. The ring end arm 74a and the ring end arm 74b are spaced apart and extend in a parallel relation to each other. Between the ring end arms 74 and the arcuate portion 72 the second ring clamp 70 may be defined by respective bends 72a, 78b that transitions between these two segments. The second ring clamp 70 may also be fabricated from a single strip of a flexibly rigid material that retains the shape as described, and any suitable thickness and material may be substituted.

The second bracket assembly 18 includes a second clamp base 78 with a generally cuboid configuration with a clamp-side face 80, a complementary base-side face 82, a right side face 84, a left side face 86 opposed thereto, a top face 88, and an opposed bottom face 90. Again, the cuboid shape is presented by way of example only, and any other suitable shape may be utilized for the second clamp base 78. The clamp-side face 80 may also be arcuate, with its curvature parameters conforming to those of the second ring clamp 70. The structure 14 can be compressively retained by both the second ring clamp 70 and the second clamp base 78, and so the arcuate configuration of the clamp-side face 80 is configured to maximize the contact surface area.

The second clamp base 78 defines one or more pairs of slots 92. These are understood to be similar in configuration and function to the slots 44 of the first clamp base 30. Although there are two pairs of slots 92 depicted, there may be additional ones as needed. Each pair of slots 92 receptively engage the second ring clamps 70.

The second ring clamps 70 may be frictionally locked to the second clamp base 78. With specific reference to FIG. 6, the ring end arm 74 defines a ridge 94 and a wedge end portion 96. The spacing of the pair of slots 92 are understood to be narrower than the uncompressed static state of the second ring clamps 70. To insert the ring end arms 74 into the slots 92, they are compressed by applying a force in the insertion direction that translated to a perpendicular compression force by the ridge 94 to narrow the spacing between the ring end arms 74.

After insertion, the second ring clamps 70 may expand and return to its original shape, at least with respect to the ring end arms 74. While in the compressed state, the ridge 94 passes through the slot 92. Once expanded, the ridge 94 engages an outer columnar wall 98 of the second clamp base 78. The ridge 94 can restrict the removal of the second ring clamps 70, though applying a compression force to the ends of the arcuate portion 72 toward the ring end arms 74 can narrow the spacing therebetween to allow the same to pass through the slots 92 and bypass the outer columnar wall 98.

An additional modality for securing the coupling of the second ring clamps 70 and the second clamp base 78 is contemplated. The second clamp base 78 defines cross through-holes 100 that extend between the corresponding pairs of the slots 92. Similarly, the wedge end portion 96 of the second ring clamps 70 similarly define holes 102 that, with the second ring clamps 70 fully inserted into the slots 92, are aligned with the cross through-holes 100.

The aforementioned fastener 54 may be inserted to secure the second ring clamps 70 to the second clamp base 78. The head 56 of the fastener 54 engages the washer 60, which compresses against one of the ring end arms 74 of the second ring clamps 70 and the wall defining the slot 92 of the second clamp base 78. The shank of the bolt passes through the holes 102 of the second ring end arm 74a, then through the washer 60, and through the cross through-hole 100. The second ring end arm 74b abuts against the wall defining the slot 92 and the fastener 54 passes through the hole 102 thereof. The nut 62 is threaded on to the bolt and tightened. According to one embodiment, the second ring end arm 74b may define a correspondingly shaped inset 104 that restricts the rotational movement of the nut 62, such that only the drive of the fastener 54 need be manipulated. Along these lines, the exemplary embodiments shown in the figures utilize a hex head, but it will be recognized that any other suitable drive may be substituted. The left and right side faces 84, 86 of the second clamp base 78 are understood to be open and substantially in alignment with the slots 92 to provide access for the fastener 54 and the nut 62.

The second clamp base 78 includes a second clamp base coupling 106 that is engageable with the aforementioned first clamp base coupling 68. As illustrated, the second clamp base coupling 106 is a plug that extends from the body of the second clamp base 78 and is sized and shaped to be received within the socket. Specifically, the plug projects from the complementary base-side face 82 of the second clamp base 78 and has a cuboid shape. Additionally, the second clamp base coupling 106 defines a first circumferential groove 108a and a second circumferential groove 108b partially within which a first elastomeric gasket 110a and second elastomeric gasket 110b, respectively, are retained. The elastomeric gaskets 110 are understood to increase the frictional engagement of the plug within the socket.

FIG. 1 best illustrates first clamp base 30 coupled to the second clamp base 78. Again, the first clamp base coupling 68, e.g., the socket, receives the second clamp base coupling 106, e.g., the plug. Furthermore, the first clamp base 30, and specifically the complementary base-side surface 82 thereof, abuts against the second clamp base 78, and specifically the complementary base-side surface 84 thereof. Because of the frictional retention enhanced by the elastomeric gasket 110, it is envisioned that the first bracket assembly 16 and the article 12 mounted thereto does not get disengaged from the second bracket assembly 18, unless the second bracket assembly 18 is mounted to the structure 14 in a manner that whatever gravitational or other force upon the first bracket assembly 16 overcomes the frictional retention force. However, this retention force is contemplated to be that which can be readily overcome with a user manually forcing a disengagement.

Before such disengagement is possible, however, the locking pin 20 that locks the first clamp base 30 and the second clamp base 78 together is to be removed. In further detail, the first clamp base 30 defines a cross through-hole 112 that traverses the first clamp base coupling 68. Additionally, the second clamp base coupling 106 also defines a cross through-hole 114 that is axially aligned with the cross through-hole 112 of the first clamp base 30 when it is fully seated within the first clamp base coupling 68. Thus, the cross through-hole 112 may effectively be an extension of the cross through-hole 114 when the first bracket assembly 16 and the second bracket assembly 18 are coupled together. In a commonly defined bore extending through the first clamp base 30 and the second clamp base coupling 106, the locking pin 20 is inserted, as shown in FIG. 1. As further illustrated in FIGS. 2 and 3, the locking pin 20 is defined by a latch arm 116, a shaft portion 118, and a distal end 120 with a ball detent 122. In one embodiment, the locking pin 20 is a twist-type, in which the ball detent 122 is disengaged from a catch within the aforementioned common bore by rotating the latch arm 116, shaft portion 118, and the ultimately the ball detent 122 from the catch. By so disengaging, the locking pin 20 may be withdrawn from the common bore and separated from the first clamp base 30 and the second clamp base 78.

With the locking pin 20 inserted, pulling apart the first clamp base 30 from the second clamp base 78 may be prevented. However, with the removal of the locking pin 20, the first clamp base 30 may be readily removed from the second clamp base 78. In order for the locking pin 20 to not get lost upon removal, there may be a split-key ring 124 attached to the latch arm 116, and a lanyard 126 tied to the split-key ring 124. The lanyard 126, in turn, may be tied to another split-key ring 128 that is attached to the second clamp base 78. The attachment location of the second split-key ring 128 is by way of example only, and not of limitation. However, in a preferable though optional embodiment, the locking pin 20 is intended to remain with the structure 14 rather than the article 12.

The particulars shown herein are by way of example and for purposes of illustrative discussion of the embodiments of the accessory mounting bracket only and are presented in the cause of providing what is believed to be the most useful and readily understood description of the principles and conceptual aspects thereof. In this regard, no attempt is made to show more details than is necessary for a fundamental understanding of the disclosure, the description taken with the drawings making apparent to those skilled in the art how the several forms of the presently disclosed accessory mounting bracket may be embodied in practice.

What is claimed is:

1. A mounting bracket for releasably securing an article to a structure, comprising:

a first bracket assembly including one or more first ring clamps each defined by opposed ring end arms, a first clamp base defining one or more pairs of slots each receptive to corresponding ones of the opposed ring end arms of the one or more first ring clamps and including a first clamp base coupling, each of the one or more first ring clamps together with the first clamp base being engageable to the article;

a second bracket assembly including one or more second ring clamps each defined by opposed ring end arms, a second clamp base defining one or more pairs of slots each receptive to corresponding ones of the opposed ring end arms of the one or more second ring clamps and including a second clamp base coupling engageable with the first clamp base coupling, each of the one or more second ring clamps together with the second clamp base being engageable to the structure; and a locking pin removably engaged with the first clamp base coupling and the second clamp base coupling.

2. The mounting bracket of claim 1, further comprising fasteners securing each of the one or more first ring clamps to the first clamp base and the one or more second ring clamps to the second clamp base.

3. The mounting bracket of claim 2, wherein first clamp base and the second clamp base each define cross through-holes extending between the corresponding pairs of slots, the cross through-holes being receptive to a one of the fasteners.

4. The mounting bracket of claim 1, wherein the second clamp base coupling is a plug and the first clamp base coupling is a socket receptive to the plug.

5. The mounting bracket of claim 4, wherein the plug defines a cross through-hole, and the second clamp base defines a cross through-hole axially aligned with the cross through-hole of the plug with the socket being engaged with the plug.

6. The mounting bracket of claim 5, wherein the locking pin is insertable through the cross through-holes of the plug and the second clamp base.

7. The mounting bracket of claim 1, wherein the first clamp base and the second clamp base are each defined by a clamp-side face, an opposite base-side face, and opposed side faces.

8. The mounting bracket of claim 7, wherein the clamp-side face of the first clamp base and the second clamp base are at least partially arcuate.

9. A releasable mounting bracket assembly, comprising:
a first clamp base defining one or more pairs of first retainer slots and fastener through-holes extending between given pairs thereof, the first clamp base including a first base coupling;
one or more first retainers with ends insertable into a given pair of the first retainer slots;
one or more fasteners compressively retaining each of the one or more first retainers and extending through the respective one of the fastener through-holes of the first clamp base;
a second clamp base defining one or more pairs of retainer slots and fastener through-holes extending between given pairs thereof, the second clamp base including a second base coupling engageable with the first base coupling;
one or more second retainers with ends insertable into a given pair of the second retainer slots; and
one or more fasteners compressively retaining each of the one or more second retainers and extending through the respective one of the fastener through-holes of the second clamp base.

10. The releasable mounting bracket assembly of claim 9, further comprising a locking pin engageable with the first clamp base and the second clamp base.

11. The releasable mounting bracket assembly of claim 10, wherein the locking pin includes one or more biased ball members engageable with corresponding detents defined within either one or both of the first clamp base and the second clamp base.

12. The releasable mounting bracket assembly of claim 10, wherein:
the first base coupling defines a through-hole; and
the second clamp base defines an extension of the through-hole of the first base coupling and being in axial alignment therewith, the extension and the through-hole being receptive to the locking pin.

13. The releasable mounting bracket assembly of claim 9, wherein the first base coupling is a plug and the second base coupling is a socket receptive to the plug.

14. The releasable mounting bracket assembly of claim 13, further comprising one or more elastomeric rings disposed at least partially within a circumferential groove defined around the plug, the elastomeric gasket increasing frictional retention of the plug within the socket.

15. The releasable mounting bracket assembly of claim 9, wherein the one or more first retainers is a ring clamp engageable with a tubular structure.

16. The releasable mounting bracket assembly of claim 9, wherein the one or more second retainers is a ring clamp engageable with a fire extinguisher body.

17. A universal bracket base for interchangeable clamps, comprising:
a body defined by an at least partially arcuate clamp-side face, a complementary base engagement face, and side faces, the body further defining one or more pairs of slots and cross through-holes extending between each of the pairs of slots, the slots being receptive to the interchangeable clamps and being securable with fasteners inserted in the cross through-holes and compressively retained at opposite ends; and
a coupling centrally disposed on the complementary base engagement face of the body and extending between a first one of the pairs of slots and a second one of the pairs of slots.

18. The universal bracket base of claim 17, wherein the coupling is a plug, the plug defining a through-hole receptive to a cross pin.

19. The universal bracket base of claim 17, wherein the coupling is a socket receptive to another coupling of a different bracket base, the body further defining a through-hole receptive to a cross pin.

20. The universal bracket base of claim 17, wherein the side faces of the body are open in alignment with the pairs of slots.

* * * * *